United States Patent
Inohiza

(10) Patent No.: US 12,445,284 B2
(45) Date of Patent: Oct. 14, 2025

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 18/449,300

(22) Filed: Aug. 14, 2023

(65) Prior Publication Data

US 2023/0388117 A1    Nov. 30, 2023

Related U.S. Application Data

(63) Continuation of application No. PCT/JP2021/047538, filed on Dec. 22, 2021.

(30) Foreign Application Priority Data

Feb. 16, 2021    (JP) .................................. 2021-022706

(51) Int. Cl.
  *H04L 29/06*    (2006.01)
  *H04L 9/16*    (2006.01)
  (Continued)

(52) U.S. Cl.
  CPC ............. *H04L 9/16* (2013.01); *H04W 12/041* (2021.01); *H04W 76/15* (2018.02)

(58) Field of Classification Search
  CPC ........ H04L 9/16; H04W 12/041; H04W 76/15
  See application file for complete search history.

(56) References Cited

U.S. PATENT DOCUMENTS

| | | | |
|---|---|---|---|
| 5,715,314 A * | 2/1998 | Payne | G06Q 20/401 705/26.35 |
| 2014/0208115 A1* | 7/2014 | Fukada | H04L 9/0891 713/168 |

(Continued)

FOREIGN PATENT DOCUMENTS

| | | |
|---|---|---|
| JP | 2017512426 A | 5/2017 |
| JP | 2018050133 A | 3/2018 |

(Continued)

OTHER PUBLICATIONS

Hahn, Florian, and Florian Kerschbaum. "Searchable encryption with secure and efficient updates." Proceedings of the 2014 ACM SIGSAC conference on computer and communications security. 2014. (Year: 2014).*

(Continued)

*Primary Examiner* — Shawnchoy Rahman
(74) *Attorney, Agent, or Firm* — Canon U.S.A., Inc. IP Division

(57) ABSTRACT

A communication apparatus for executing wireless communication complying with an IEEE 802.11 standard series by establishing a plurality of links with another apparatus updates an encryption key individually set for each of the plurality of links by executing predetermined processing including transmission of a predetermined message to the other apparatus. In the predetermined processing, the communication apparatus transmits, to the other apparatus, the predetermined message including information concerning the encryption keys for at least two links among the plurality of links.

7 Claims, 10 Drawing Sheets

(51) Int. Cl.
  *H04W 12/041* (2021.01)
  *H04W 76/15* (2018.01)

(56) References Cited

U.S. PATENT DOCUMENTS

| | | | | |
|---|---|---|---|---|
| 2016/0142915 | A1* | 5/2016 | Choyi | H04L 63/08 |
| | | | | 726/4 |
| 2018/0014083 | A1 | 1/2018 | Wang | |
| 2020/0404496 | A1 | 12/2020 | Chu | |

FOREIGN PATENT DOCUMENTS

| | | |
|---|---|---|
| KR | 20160114129 A | 10/2016 |
| WO | 2015/130500 A1 | 9/2015 |

OTHER PUBLICATIONS

Po-Kai Huang (Intel); Multi-link security consideration; IEEE 802.11-19/1822r9; Nov. 5, 2019; Internet <URL:https://mentor.ieee.org/802.11/dcn/19/11-19-1822-09-00be-multi-link-security-consideration.pptx>; pp. 1-18.

* cited by examiner

| Field | NUMBER OF BITS | DESCRIPTION |
|---|---|---|
| Key ID | 2 | IDENTIFIER OF KEY |
| Tx | 1 | 0: USE TEMPORARY KEY FOR ONLY RECEIVE<br>1: USE TEMPORARY KEY FOR ONLY TRANSMIT/RECEIVE |
| Reserved | 5 | RESERVATION BIT |
| Reserved | 8-k | RESERVATION BIT |
| Link ID | k | IDENTIFIER OF LINK TO WHICH GTK IS APPLIED |
| Key RSC | 48 | RECEIVING SEQUENCE NUMBER OF KEY |
| GTK | (Length-12)x8 | ENCRYPTION KEY OF BROADCAST AND MULTICAST COMMUNICATION |

COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2021/047538, filed Dec. 22, 2021, which claims the benefit of Japanese Patent Application No. 2021-022706 filed Feb. 16, 2021, both of which are hereby incorporated by reference herein in their entireties.

BACKGROUND OF THE INVENTION

Field of the Invention

The present invention relates to a communication control technique using a plurality of radio links.

Background Art

As communication standards concerning a wireless LAN (Wireless Local Area Network), IEEE (Institute of Electrical and Electronics Engineers) 802.11 standards are known. The IEEE 802.11ax standard as a standard of the IEEE 802.11 standard series implements improvement of a communication speed under a congested situation using OFDMA (Orthogonal Frequency-Division Multiple Access), in addition to high peak throughput (see Japanese Patent Laid-Open No. 2018-050133).

Presently, to further improve the throughput, a task group for defining the IEEE 802.11be standard as a new standard has been formed. This task group has examined multi-link communication in which one access point (AP) simultaneously executes communications by establishing, with one station (STA), a plurality of radio links via a plurality of different frequency channels.

In a wireless LAN, data encrypted by a data frame is generally transmitted. In this encryption, a PTK (Pairwise Transient Key) is used for one-to-one data transmission, and a GTK (Group Transient Key) is used for multicast data transmission. In multi-link communication, these keys are managed by different methods. That is, a PTK is generated for each apparatus regardless of the number of links, and is managed only between two apparatuses that communicate with each other, and a GTK is generated for each of a plurality of links in multi-link communication. A PTK and a GTK are generated when the STA is connected to the AP. Furthermore, the GTK is updated every time a predetermined period defined by the AP elapses after establishment of connection between the AP and the STA.

When updating a GTK, predetermined frames are exchanged between an AP and an STA. On the other hand, as described above, a GTK is generated for each link and updated every predetermined period. Therefore, if the number of links in multi-link communication increases, the overhead of communication accordingly increases.

SUMMARY OF THE INVENTION

The present invention provides an efficient communication control technique in a wireless communication system capable of constituting a multi-link.

A communication apparatus according to one aspect of the present invention is a communication apparatus for executing wireless communication complying with an IEEE 802.11 standard series by establishing a plurality of links with another apparatus, comprising an update unit configured to update an encryption key individually set for each of the plurality of links by executing predetermined processing including transmission of a predetermined message to the other apparatus, wherein in the predetermined processing, the update unit transmits, to the other apparatus, the predetermined message including information concerning at least two links among the plurality of links.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a sequence chart showing the third example of the GTK update processing executed between the AP and the STA.

FIG. 11 is a table showing fields included in an MLO GTK KDE and contents of the fields.

DESCRIPTION OF THE EMBODIMENTS

Figure 1:
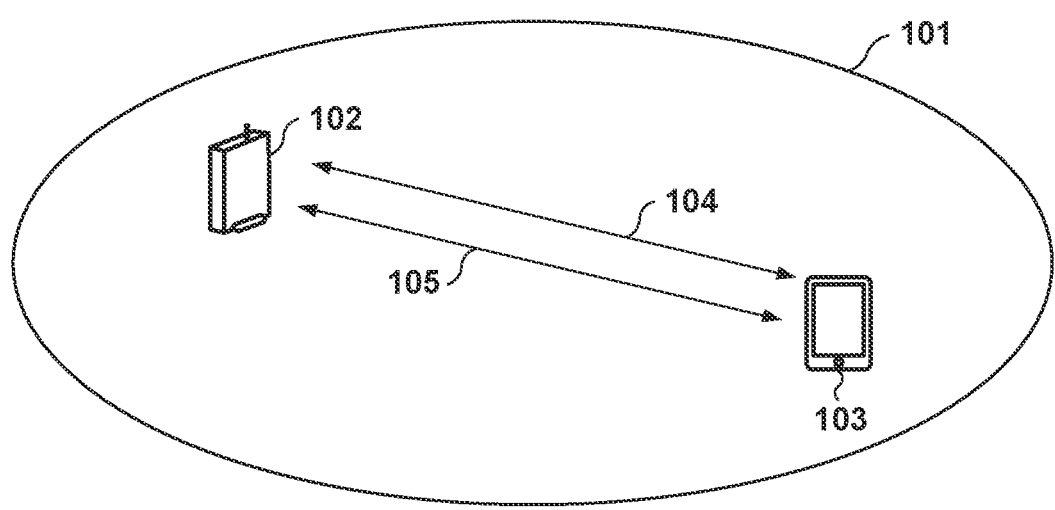
FIG. 1 is a view showing an example of the configuration of a system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration of System

FIG. 1 shows an example of the configuration of a wireless communication system according to an embodiment. The wireless communication system includes, as wireless communication apparatuses, an access point (AP 102) and a station (STA 103) of a wireless LAN (Local Area Network). Then, when the STA 103 joins a network 101 formed by the AP 102, wireless communication is performed between the AP 102 and the STA 103. In one example, each of the AP 102 and the STA 103 can execute wireless communication complying with the IEEE (Institute of Electrical and Electronics Engineers) 802.11be (EHT) standard. Note that EHT is an abbreviation for Extremely High Throughput but EHT may be interpreted as an abbreviation for Extreme High Throughput.

As one example, assume that the STA 103 is configured to execute multi-link communication in which a plurality of radio links with the AP 102 are established to perform communication, and can transmit/receive a frame in each of the plurality of radio links. FIG. 1 shows an example in a case where two links of a first link 104 and a second link 105 are used. In each link, channels (frequency channels) in the frequency bands of the 2.4-, 5-, and 6-GHz bands can be used. Note that a use frequency band is not limited to them, and a different frequency band such as the 60-GHz band may be used. In one example, the AP 102 and the STA 103 can communicate with each other by simultaneously establishing the first link 104 using a channel in the first frequency band (for example, the 2.4-GHz band) and the second link 105 using a channel in the second frequency band (for example, the 5-GHz band). Note that the use frequency channel can be selected in accordance with the capability information of multi-link communication between the STA and the AP. For example, channels in the 2.4- and 5-GHz bands may be used in combination or a plurality of channels selected from the 6-GHz band may be used in combination. Multi-link communication may be executed using a plurality of channels in one frequency band. That is, in a plurality of links in multi-link communication, any combination of frequency channels may be used as long as different frequency channels are used. However, frequency channels to be used in the plurality of links established by the AP 102 and the STA 103 are selected so that the channel interval between the use frequency channels is at least larger than 20 MHz. The AP 102 maintains the second link 105 using the second frequency channel while maintaining the first link 104 using the first frequency channel.

Note that FIG. 1 shows an example in a case where two links are established between the AP 102 and the STA 103, but three or more links may be established. Note also that in the three or more links, frequency channels in different frequency bands may be used, or in two or more of the three or more links, different frequency channels within the same frequency band may be used.

The AP 102 can establish, with the STA 103, links via a plurality of frequency channels, thereby improving throughput in communication with the STA 103. Furthermore, when the AP 102 establishes, with the STA 103, a plurality of connections using different frequency channels, even if a given frequency channel is congested, the AP 102 can communicate with the STA 103 using another frequency channel. Therefore, even in a status in which sufficient throughput cannot be achieved due to congestion of some frequency channels or the like, the AP 102 can prevent a decrease in throughput in overall communication with the STA 103.

Note that when executing multi-link communication, the AP 102 creates a plurality of wireless networks corresponding to the plurality of links. In this case, the AP 102 internally includes a plurality of APs, and operates so that each AP creates a wireless network. The plurality of internal APs of the AP 102 may be implemented by individual physical APs (communication circuits each having an AP function or the like) or may be implemented as a plurality of virtual APs by only one physical AP. Note that in a case where the plurality of links are established using different frequency channels belonging to a common frequency band, a common wireless network may be created for the plurality of links.

When executing multi-link communication, each of the AP 102 and the STA 103 can divide one data and transmit the data to the partner apparatus via the plurality of links. Furthermore, the AP 102 and the STA 103 may execute communication in one link as backup communication for communication in another link by transmitting the same data in each of the plurality of links. For example, the AP 102 can transmit the same data to the STA 103 via the first link using the first frequency channel and the second link using the second frequency channel. In this case, even if, for example, an error occurs in communication in the first link, the same data is transmitted in the second link, and thus the STA 103 can receive, via the second link, the data transmitted from the AP 102. The AP 102 and the STA 103 may selectively use the link in accordance with the type of frame or data to be communicated. For example, when transmitting data concerning a captured image, the AP 102 can transmit meta information such as the date, parameters (f-number and shutter speed) at the time of image capturing, and position information via the first link, and transmit pixel information via the second link. Furthermore, the AP 102 can transmit a management frame complying with the IEEE 802.11 standard series via the first link, and transmit a data frame including data via the second link.

Note that the management frame includes, for example, a Beacon frame, a Probe Request frame/Response frame, and an Association Request frame/Response frame. In addition to these frames, a Disassociation frame, an Authentication frame, a De-Authentication frame, and an Action frame are also called management frames. The Beacon frame is a frame that makes a notification of network information. The Probe Request frame is a frame that requests network information, and the Probe Response frame is a response to the Probe Request frame and is a frame that provides the network information. The Association Request frame is a frame that requests connection, and the Association Response frame is a response to the Association Request frame and is a frame that indicates permission of connection or an error. The Disassociation frame is a frame used to disconnect the connection. The Authentication frame is a frame used to authenticate the partner apparatus. The De-Authentication frame is a frame used to interrupt authentication of the partner apparatus and disconnect the connection. The Action frame is a frame used for an additional function other than the above-described ones. Note that the AP 102 may transmit at least one of a FILS Discovery frame and an Unsolicited Probe Response frame in addition to the Beacon frame to make a notification of network information. Here, FILS is an acronym for Fast Initial Link Setup.

Note that each of the AP 102 and the STA 103 is assumed to support the IEEE 802.11be standard. In addition to this, each of the AP 102 and the STA 103 may support at least one of legacy standards defined before the IEEE 802.11be standard. The legacy standards include, for example, the IEEE 802.11a/b/g/n/ac/ax standards. Note that in this embodiment, the IEEE 802.11 standard series indicates at least one of the IEEE 802.11a/b/g/n/ac/ax/be standards. Furthermore, in addition to the IEEE 802.11 standard series, each of the AP 102 and the STA 103 may support another communication standard such as Bluetooth®, NFC, UWB, ZigBee, or MBOA. Note that UWB is an acronym for Ultra Wide Band, and MBOA is an acronym for Multi Band OFDM Alliance. Note also that OFDM is an acronym for Orthogonal Frequency Division Multiplexing. In addition, NFC is an acronym for Near Field Communication. UWB includes wireless USB (Universal Serial Bus), wireless 1394, and WiNET. In addition, each of the AP 102 and the STA 103 may support a wired communication standard of a wired LAN or the like.

The AP 102 can be, for example, a wireless LAN router, a PC (Personal Computer), or the like, but is not limited to them. As the AP 102, an arbitrary communication apparatus that can execute multi-link communication with another communication apparatus suffices. Furthermore, the STA 103 can be, for example, a camera, a tablet, a smartphone, a PC, a mobile phone, a video camera, or the like, but is not limited to them. As the STA 103, an arbitrary communication apparatus that can execute multi-link communication with another communication apparatus suffices, similar to the AP 102. FIG. 1 shows only one AP and one STA but the number of APs and the number of STAs are not limited to this example.

Note that this embodiment has explained that the AP 102 serves as an access point and the STA 103 serves as a station. However, the present invention is not limited to this and the AP 102 and the STA 103 may serve as stations. In this case, the AP 102 serves as a station but operates as an apparatus having a role of creating a wireless network for establishing a link with the STA 103.

Arrangement of Apparatus

Figure 2:
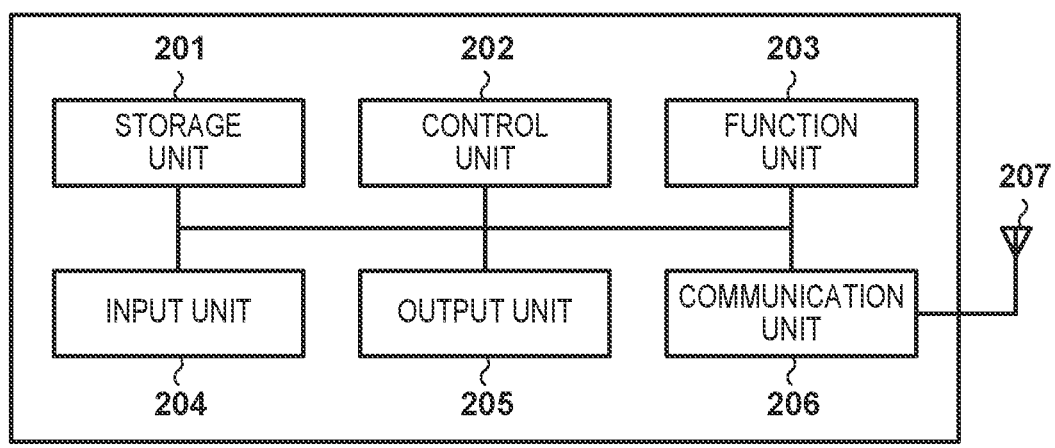
FIG. 2 is a block diagram showing an example of the hardware arrangement of an AP.

FIG. 2 is a block diagram showing an example of the hardware arrangement of the AP 102 according to this embodiment. The AP 102 includes, for example, a storage unit 201, a control unit 202, a function unit 203, an input unit 204, an output unit 205, a communication unit 206, and an antenna 207. Note that the STA 103 can have the same arrangement.

The storage unit 201 includes one or more memories such as a ROM and a RAM, and stores computer programs configured to perform various kinds of operations to be described later and various kinds of information such as communication parameters for wireless communication. Note that ROM is an acronym for Read Only Memory, and RAM is an acronym for Random Access Memory. Note that, in addition to or instead of the memory such as the ROM or the RAM, the storage unit 201 may include a storage medium such as a flexible disk, a hard disk, an optical disk, a magnetooptical disk, a CD-ROM, a CD-R, a magnetic tape, a nonvolatile memory card, or a DVD. The storage unit 201 may include a plurality of memories.

The control unit 202 is formed by, for example, one or more processors such as a CPU and an MPU, and controls the whole AP 102 by executing, for example, computer programs stored in the storage unit 201. Note that CPU is an acronym for Central Processing Unit, and MPU is an acronym for Micro Processing Unit. The control unit 202 can be configured to execute processing of generating data or signals to be transmitted in communication with another communication apparatus (for example, the STA 103) in addition to control of the whole AP 102. Note that the control unit 202 may be configured to execute processing such as control of the whole AP 102 by, for example, cooperation of the computer programs stored in the storage unit 201 and an OS (Operating System). The control unit 202 may include a plurality of processors such as a multi-core processor, and execute processing such as control of the whole AP 102 by the plurality of processors. Furthermore, the control unit 202 may be formed by an ASIC (Application Specific Integrated Circuit), a DSP (Digital Signal Processor), an FPGA (Field Programmable Gate Array), or the like.

The control unit 202 controls the function unit 203 to execute predetermined processing such as image capturing, printing, or projection. The function unit 203 is hardware used by the AP 102 to execute predetermined processing. For example, in a case in which the AP 102 is a camera, the function unit 203 is an image capturing unit and performs image capturing processing. For example, in a case in which the AP 102 is a printer, the function unit 203 is a printing unit and performs print processing. For example, in a case in which the AP 102 is a projector, the function unit 203 is a projection unit and performs projection processing. Data to be processed by the function unit 203 may be data stored in the storage unit 201, or may be data communicated with another communication apparatus (for example, the STA 103) via the communication unit 206 (to be described later).

The input unit 204 accepts various operations from a user. The output unit 205 performs various kinds of outputs to the user. In this example, the output by the output unit 205 includes, for example, at least one of display on a screen, audio output by a loudspeaker, vibration output, and the like. Note that both the input unit 204 and the output unit 205 may be implemented by one module, like a touch panel. Each of the input unit 204 and the output unit 205 may be incorporated in the AP 102 or may be formed as an external apparatus connected to the communication apparatus.

The communication unit 206 controls wireless communication complying with the IEEE 802.11 standard series, or controls IP communication. In this embodiment, the communication unit 206 is particularly configured to control wireless communication complying with the IEEE 802.11be standard. Note that the communication unit 206 may control wireless communication complying with another IEEE 802.11 standard series in addition to the IEEE 802.11be standard, or control wired communication of a wired LAN or the like. The communication unit 206 controls the antenna 207 to, for example, transmit/receive signals for wireless communication, which have been generated by the control unit 202. The AP 102 may include a plurality of communication units 206. If the AP 102 includes the plurality of communication units 206, the AP 102 can establish one link by one communication unit 206 when establishing a plurality of links in multi-link communication. Note that the AP 102 may establish one link for each of some of the communication units 206, and establish a plurality of links for the remaining communication units 206. Alternatively, the AP 102 may establish a plurality of links using one communication unit 206. In this case, the communication unit 206 can execute communication via the plurality of links by time-divisionally switching an operating frequency channel. Note that in a case where the AP 102 supports the NFC standard or Bluetooth standard in addition to the IEEE 802.11be standard, it may control wireless communication complying with these communication standards. In a case where the AP 102 can execute wireless communication complying with a plurality of communication standards, it may include a communication unit and an antenna supporting each communication standard. The AP 102 communicates data such as image data, document data, or video data with a communication partner apparatus (for example, the STA 103) via the communication unit 206. Note that the antenna 207 may be prepared separately from the communication unit 206, or may be combined with the communication unit 206 to form one module.

The antenna 207 is an antenna capable of performing communication in each of the sub-GHz band, 2.4-GHz band, 5-GHz band, and 6-GHz band. Note that the AP 102 may include a multi-band antenna as the antenna 207, or may include a plurality of antennas respectively corresponding to the frequency bands. If the AP 102 includes a plurality of antennas, it may include one communication unit 206 for the plurality of antennas or a plurality of communication units 206 respectively corresponding to the plurality of antennas. Note that the antenna 207 may be a single antenna or an antenna array. That is, the antenna 207 may include a plurality of antenna elements, and may be configured to execute, for example, MIMO (Multi-Input and Multi-Output) communication.

Figure 3:
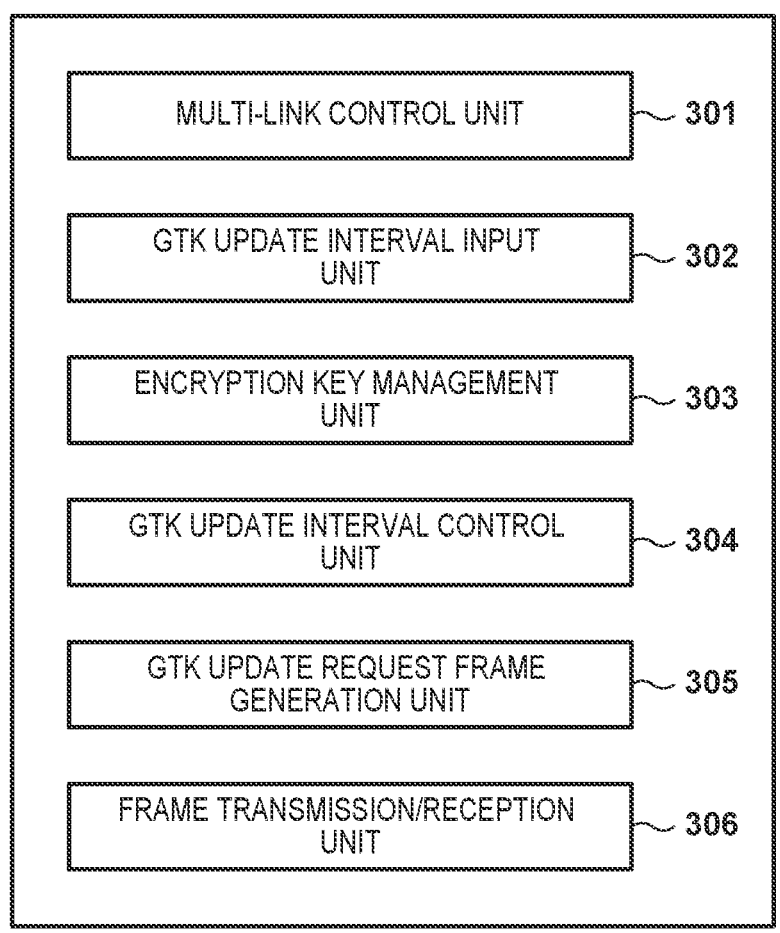
FIG. 3 is a block diagram showing an example of the functional arrangement of the AP.

FIG. 3 shows an example of the functional arrangement of the AP 102 according to this embodiment. The AP 102 includes, as functional components, for example, a multi-link control unit 301, a GTK update interval input unit 302, an encryption key management unit 303, a GTK update interval control unit 304, a GTK update request frame generation unit 305, and a frame transmission/reception unit 306. Note that these function units can be implemented when, for example, the control unit 202 executes the programs stored in the storage unit 201. However, this is merely an example and at least some of these functions may be formed by dedicated hardware components.

The multi-link control unit 301 controls communication start processing for the AP 102 to establish one or more links for wireless communication with the STA 103, processing of adding/deleting a link after the start of communication, and communication end processing of deleting all the links. When performing connection to the STA 103, the AP 102 may establish connection by a plurality of links in advance or may add another link during communication in a given link.

Furthermore, while communicating with the STA 103 by establishing a plurality of links, the AP 102 can delete one of the plurality of links. Connection processing executed between the AP 102 and the STA 103 includes, for example, Authentication processing, Association processing, and 4-Way-Handshake (4WHS) processing. Note that these processes are processes defined in the IEEE 802.11 standard series and a detailed description thereof will be omitted. Upon completion of the 4WHS processing, the AP 102 and the STA 103 generate a PTK as an encryption key for unicast communication and a GTK as an encryption key for broadcast/multicast communication. Note that PTK is an acronym for Pairwise Transient Key, and GTK is an acronym for Group Transient Key. A PTK is generated for each apparatus (that is, for each of the AP 102 and the STA 103) regardless of the number of links, and managed only between the two apparatuses that communicate with each other. On the other hand, a GTK is generated for each of a plurality of links in multi-link communication.

The GTK update interval input unit 302 provides an interface for prompting the user to input a GTK update interval by, for example, outputting a predetermined Web page. Then, the GTK update interval input unit 302 accepts, via the interface, a user input for designating a GTK update interval. Note that the AP 102 may be configured to use, for example, a GTK update interval preset in a program executed in the apparatus. In this case, the GTK update interval input unit 302 may be omitted. The encryption key management unit 303 manages the encryption keys obtained by the multi-link control unit 301. As described above, the encryption keys include the PTK and GTK, the PTK is managed for each apparatus, and the GTK is managed for each link. The GTK update interval control unit 304 manages the update timing of the GTK for each link. Then, at a predetermined timing based on the managed update timing, the GTK update interval control unit 304 notifies the GTK update request frame generation unit 305 to update the GTK. The predetermined timing may be equal to the update timing, or may be a timing a predetermined time, such as a time from when update processing starts until the update processing is completed, before the update timing. The GTK update request frame generation unit 305 generates a GTK update request frame based on reception of the update notification from the GTK update interval control unit 304. The frame transmission/reception unit 306 executes transmission of a radio frame such as a GTK update request frame and data frame and reception of a radio frame from the partner apparatus.

The GTK update request frame generated by the GTK update request frame generation unit 305 includes at least one MLO GTK KDE. Note that MLO is an acronym for Multi-Link Operation, and KDE is an acronym for Key Data Encapsulation. The MLO GTK KDE includes information such as a Link ID as identification information of each link in multi-link communication and a GTK as information of an encryption key (for example, the updated encryption key). That is, for one link, the MLO GTK KDE can be formed, as an information element including the identification information of the link and the information of the (updated) encryption key to be used in the link. FIG. 11 shows fields included in the MLO GTK KDE defined in the IEEE 802.11be standard and contents of the fields.

The GTK update request frame is transmitted every time the GTK is updated in each link. Therefore, when the GTK in each of a number of links is updated, a number of GTK update request frames are transmitted, thereby wasting radio resources. To cope with this, the AP 102 according to this embodiment completes update of the GTKs in a plurality of links by one update process. That is, the AP 102 can transmit, for example, one GTK update request frame including MLO GTK KDEs for two or more links. This can reduce the number of times of transmission of the GTK update request frame, thereby preventing radio resources from being wasted. To include information concerning each of two or more links in one GTK update request frame, the AP 102 can perform acceptance control for setting the update periods of the two or more links so that update timings in the links coincide with each other. Accordingly, with respect to the plurality of links in which the update timings of the GTKs coincide with each other, it is possible to transmit one GTK update request frame including MLO GTK KDEs for the links without disturbing the update periods. An example of this processing will be described below.

Procedure of Processing in System

Figure 4:
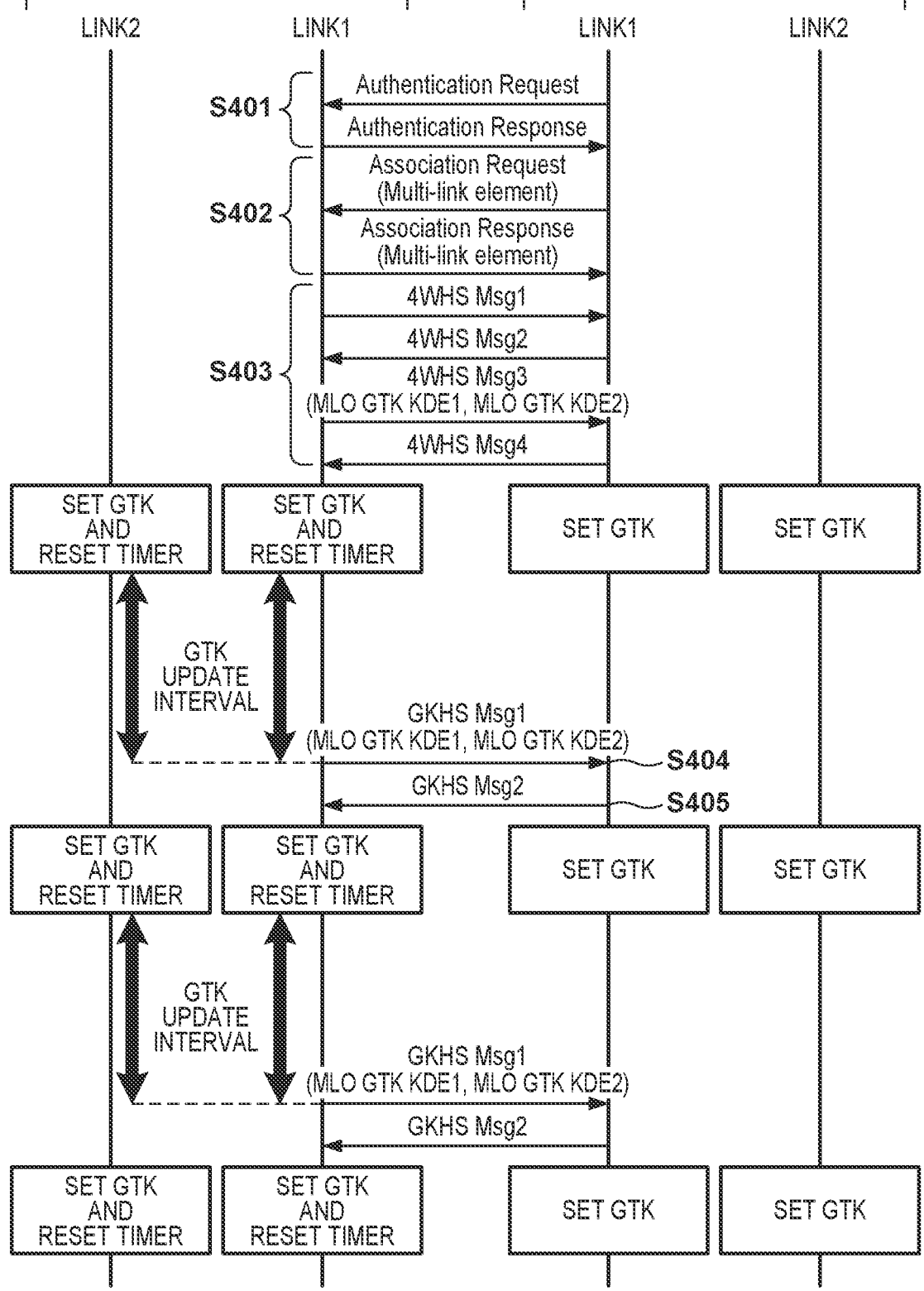
FIG. 4 is a sequence chart showing the first example of GTK update processing executed between the AP and an STA.

FIG. 4 shows the first example of the procedure of the processing executed between the AP 102 and the STA 103. FIG. 4 shows an example of the procedure of the processing by the AP 102 in a case where the GTK update intervals of links 1 and 2 are equal to each other. This processing corresponds to processing in a case where a user input is made via a setting screen displayed (for example, on an external display) by the AP 102 such that the GTK update intervals are equal to each other, or a case where the AP 102 is preset so that the GTK update intervals of a plurality of links are equal to each other. The AP 102 and the STA 103 can perform processing of communication via the first frequency channel (for example, channel 1 in the 2.4-GHz band) in link 1, and processing of communication via the second frequency channel (for example, channel 36 in the 5-GHz band) in link 2. Note that the use channels are merely examples, and a combination of other frequency channels may be used. The processing shown in FIG. 4 is started when, for example, the STA 103 activates processing for establishing connection to the AP 102.

First, the AP 102 and the STA 103 transmit/receive messages for authentication using the first frequency channel (S401). The STA 103 transmits an Authentication Request frame for authentication to the AP 102. In response to this, the AP 102 transmits an Authentication Response frame to the STA 103. Note that as an authentication method, an SAE (Simultaneous Authentication of Equals) method can be used. In this case, the Authentication Request frame and the Authentication Response frame are transmitted/received a plurality of times.

After that, the AP 102 and the STA 103 transmit/receive messages for establishment of connection (S402). To establish connection, the STA 103 transmits an Association Request frame to the AP 102. In response to this, the AP 102 transmits an Association Response frame to the STA 103 (S402). At this time, the STA 103 can indicate, to the AP 102, to request connection by a plurality of links by including a Multi-link element in the Association Request frame. Note that the Multi-link element includes information such as identification information (Link ID) for identifying a link for which connection is requested. Furthermore, the AP 102 can transmit, to the STA 103, the Association Response frame including a Multi-link element including information of a link for which connection is permitted.

Then, the AP 102 and the STA 103 execute 4WHS processing to generate encryption keys to be used for communication (S403). In the procedure of the 4WHS processing, four predetermined messages (messages 1 to 4) are transmitted/received in the conventional manner. In this example, the AP 102 transmits, to the STA 103, message 3 (4WHS Msg 3) including an MLO GTK KDE with a Link ID and a GTK for each of the plurality of links. FIG. 4 shows an example in which message 3 including MLO GTK KDE 1 for link 1 and MLO GTK KDE 2 for link 2 is transmitted. With this processing, each of the AP 102 and the STA 103 sets the GTK for each of links 1 and 2 in the radio chip of the self-apparatus. After setting the GTKs, the AP 102 resets and activates a GTK update timer of each link, and start time measurement.

If the time measured by the timer reaches the update interval, the AP 102 determines that the GTK update timing is reached, and starts, with the STA 103, GKHS (Group Key Handshake) processing for update of the GTK. In the GKHS processing, the predetermined messages (messages 1 and 2) are transmitted/received between the apparatuses (AP 102 and STA 103) that have established the link corresponding to the GTK to be updated. For example, the AP 102 transmits, to the STA 103, message 1 (GKHS Msg 1) including the MLO GTK KDE with the Link ID and GTK of the link for which the GTK is to be updated (S404). Then, the STA 103 transmits, to the AP 102, message 2 (GKHS Msg 2) based on success of reception of message 1 (S405). Thus, the GTK is shared between the AP 102 and the STA 103, thereby completing update of the GTK. In this embodiment, in a case where the update timings of the GTKs for the plurality of links coincide with each other, message 1 including MLO GTK KDEs for the plurality of links is transmitted. In the example shown in FIG. 4, since the GTK update intervals of links 1 and 2 are set to be equal to each other, as described above, the update timings of the GTKs for links 1 and 2 coincide with each other. Therefore, the AP 102 transmits message 1 including MLO GTK KDE 1 for link 1 and MLO GTK KDE 2 for link 2. That is, the AP 102 transmits one message 1 including the two MLO GTK KDEs for both links 1 and 2. Then, when the STA 103 responds to message 1 by transmitting message 2, the GTKs for the two links are updated. That is, it is possible to complete update of the two GTKs by one message 1 without transmitting two messages 1 to update the two GTKs. After that as well, the AP 102 and the STA 103 continuously update the GTKs for links 1 and 2 at the same timing. As described above, it is possible to reduce the number of messages for update of the GTKs, and suppress radio resources from being wasting.

Note that one message 1 including MLO GTK KDEs for a plurality of links is transmitted in link 1 in this embodiment but may be transmitted in link 2. That is, for example, the GKHS processing may be executed in link 2, and message 1 including MLO GTK KDE 1 for link 1 and MLO GTK KDE 2 for link 2 may be transmitted in link 2. A case where the AP 102 transmits message 1 has been explained but the STA 103 may transmit this message. Note that the same applies to other processing examples.

Figure 5:
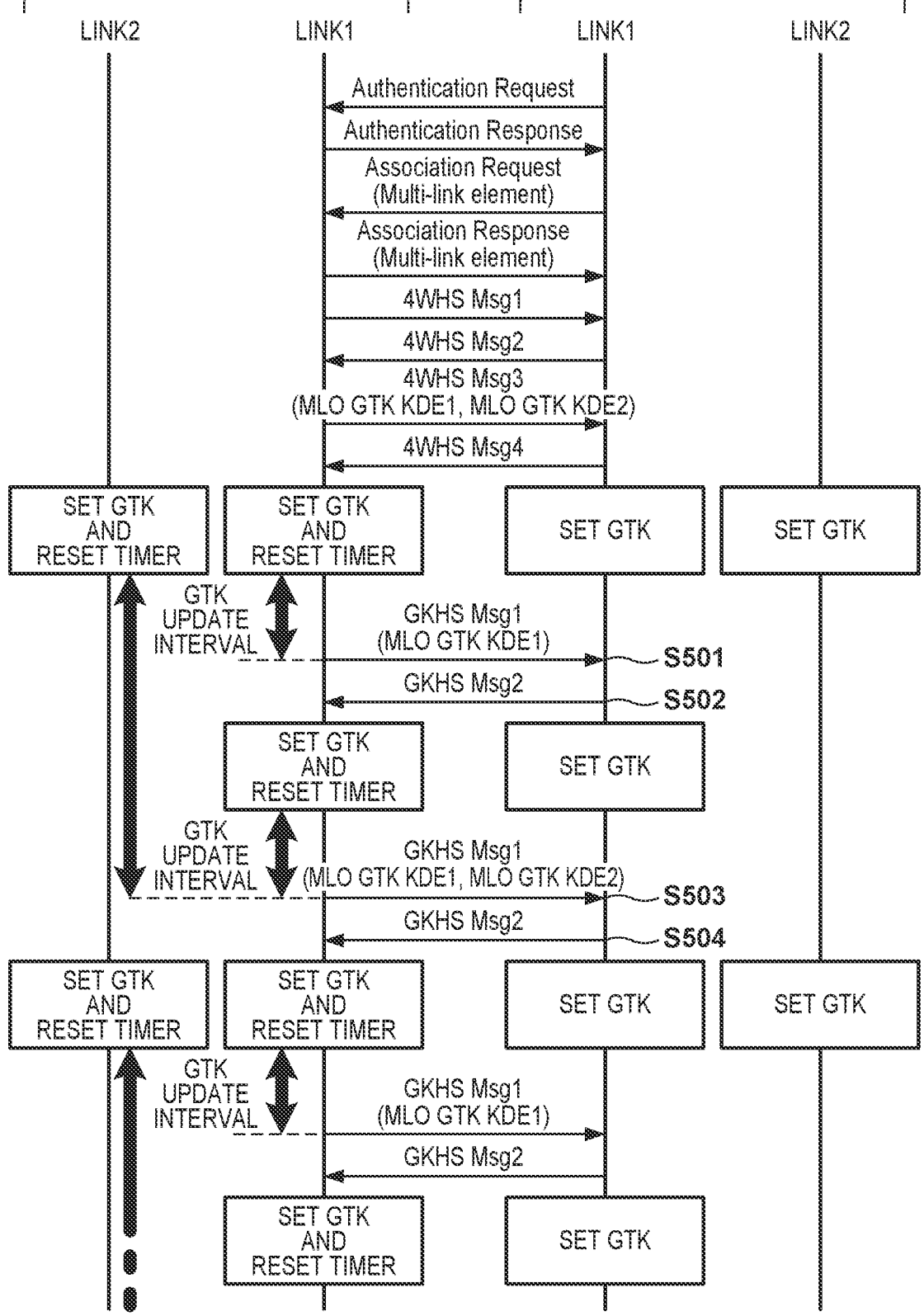
FIG. 5 is a sequence chart showing the second example of the GTK update processing executed between the AP and the STA.

In the example shown in FIG. 4, the procedure of the processing in a case where the update periods of the GTKs for the two links (links 1 and 2) coincide with each other has been explained. In other cases as well, it is possible to update the GTKs while reducing the number of times of transmission of message 1, as described above. For example, there is a case where the length of the update period of a GTK for one link is a multiple or submultiple of the length of the update period of a GTK for the other link. FIG. 5 shows an example of the procedure of the processing in a case where the length of the update interval of the GTK for link 2 is twice the length of the update interval of the GTK for link 1. Note that processing up to the GTK setting processing and the reset and activation of the timer after the end of the 4WHS processing is similar to in FIG. 4 and a description thereof will be omitted.

Since the length of the update interval of the GTK for link 2 is twice the length of the update interval of the GTK for link 1, the update timing of the GTK comes only for link 1. Therefore, at this update timing, the AP 102 transmits, to the STA 103, message 1 including MLO GTK KDE 1 for link 1, and executes GKHS processing (S501). Note that since no update timing of the GTK for link 2 comes at this time, the AP 102 transmits, to the STA 103, message 1 including no MLO GTK KDE 2 for link 2. Upon successfully receiving message 1, the STA 103 transmits message 2 to the AP 102. This causes the AP 102 and the STA 103 to update the GTK of link 1. Then, the AP 102 resets the GTK update timer of link 1.

In the example shown in FIG. 5, if the update timing of the GTK for link 1 is reached next, the update timing of the GTK for link 2 is also reached at the timing. Therefore, similar to S404 of FIG. 4, at this timing, the AP 102 generates message 1 including MLO GTK KDE 1 for link 1 and MLO GTK KDE 2 for link 2, and transmits it to the STA 103 (S503). Upon successfully receiving the message, the STA 103 responds to the message by transmitting message 2 to the AP 102 (S504). This allows the AP 102 and the STA 103 to update the GTK for link 1 and the GTK for link 2 at the same time. Then, the AP 102 resets the GTK update timers of links 1 and 2. After that, the processes in S501 to S504 are repeatedly executed.

As described above, when each of the lengths of the update periods of the GTKs for some links among the plurality of links is a multiple or submultiple of the length of the update period of the GTK for another link, it is possible to suppress the transmission frequency of the message transmitted to update the GTKs. Note that in this embodiment, the "multiple" indicates a positive integer multiple of a reference value and does not include zero times or a negative integer multiple. However, the multiple may include a value that is one-fold of the reference value (that is, the same value). Therefore, by generalizing the case shown in FIG. 4 and the case shown in FIG. 5, it can be said that if each of the lengths of the update periods of the GTKs for some links is a multiple or submultiple of the length of the update period of the GTK for another link, the processing according to this embodiment can be executed.

Figure 6:
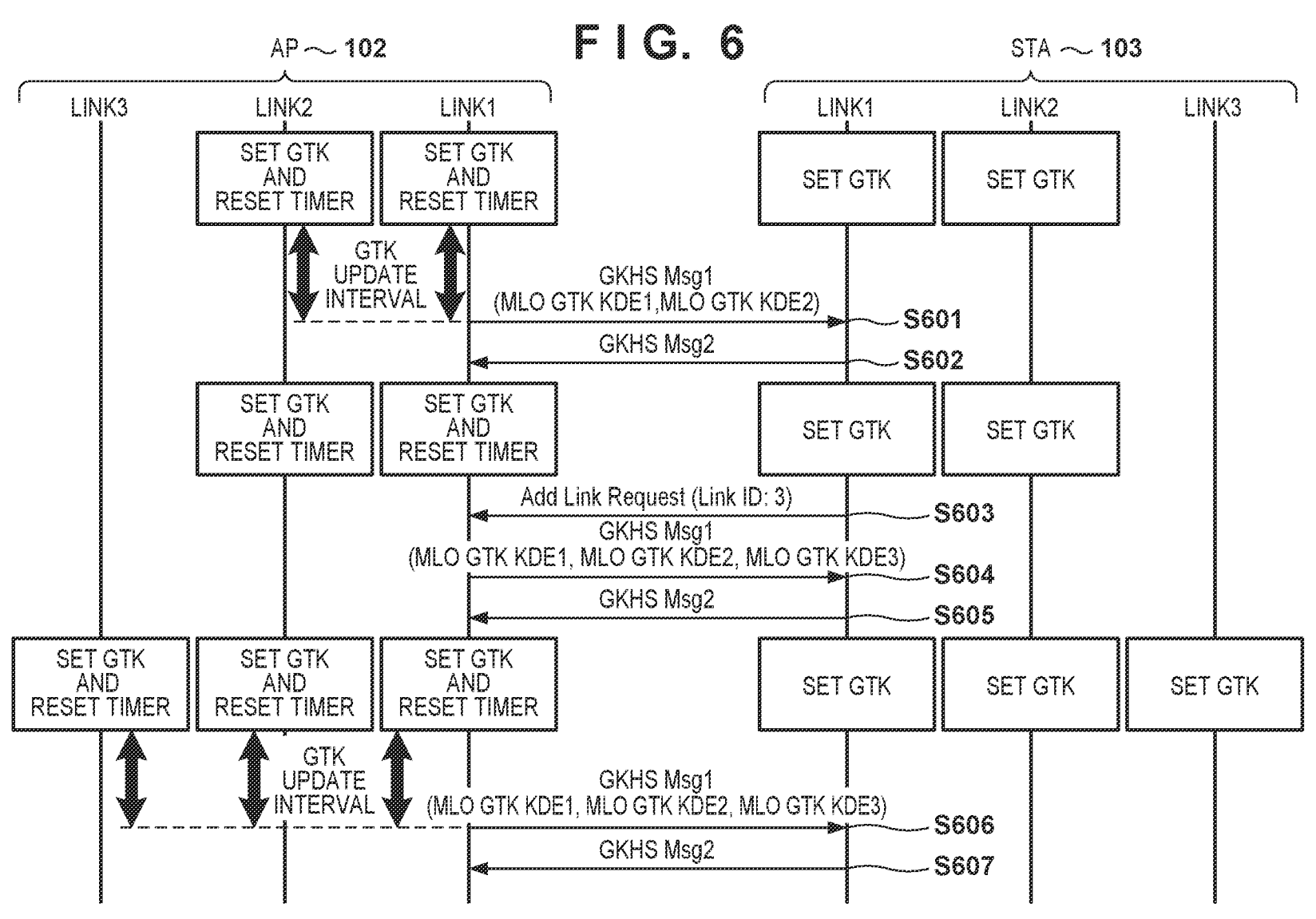

FIG. 6 shows an example of the procedure of processing in a case where link 3 is added while links 1 and 2 are established and used for communication between the AP 102 and the STA 103. Note that in the example shown in FIG. 6, the update intervals of the GTKs for all the links are equal to each other. However, this is merely an example and, for example, the update interval of the GTK for link 2 is twice the update interval of the GTK for link 1 and the update interval of the GTK for link 3 is three times the update interval of the GTK for link 1. That is, as long as each of the lengths of the update periods of the GTKs for some links among the plurality of links is a multiple or submultiple of the length of the update period of the GTK for another link, any relationship among the update periods may be used.

If, in a state in which links 1 and 2 are established, the update timings of the GTKs for these links come, the AP 102 transmits, to the STA 103, message 1 including MLO GTK KDEs for links 1 and 2, similar to S404 of FIG. 4 (S601). Then, similar to S405 of FIG. 4, the STA 103 responds to the message by transmitting message 2 to the AP 102 (S602). In response to this, the AP 102 and the STA 103 update the GTKs for links 1 and 2, and the AP 102 resets the GTK update timers of links 1 and 2.

After that, for example, assume that the STA 103 decides to add a link (for example, by an instruction of an application or a user operation). In this case, the STA 103 transmits, to the AP 102, an Add Link Request indicating a request to add link 3 (S603). Upon receiving the Add Link Request, the AP 102 transmits, to the STA 103, message 1 (GKHS Msg 1) of GKHS processing including three MLO GTK KDEs respectively corresponding to links 1 to 3 (S604). Note that message 1 is transmitted even if the update timings of the GTKs for links 1 and 2 have not yet come. Upon receiving message 1, the STA 103 responds to the message by transmitting message 2 to the AP 102 (S605). Then, in response to this, the AP 102 and the STA 103 update the GTKs for links 1 and 2, and also sets the GTK for link 3. Furthermore, the AP 102 resets the GTK update timers of links 1 and 2, and activates the GTK update timer of link 3.

As described above, in the processing shown in FIG. 6, in a case where a link addition request is received, even if the update timing of the GTK for each link has not yet come, the GTKs for other links are updated at a timing of setting the GTK for the added link. Since this processing resets the GTK update timers of all the links at the same time, the GTK update timings can be made to coincide with each other among the links. As a result, as described with reference to FIGS. 4 and 5, since it is possible to suppress the transmission/reception frequency of the message of the GKHS processing at the time of updating the GTKs, it is possible to update the GTKs while suppressing radio resources from being wasted.

Note that the processing at the time of adding a link has been explained with reference to FIG. 6 but processing at the time of deleting a link may be performed in the same manner. For example, assume that in a case where the update periods for links 1 and 2 are decided with reference to the update period of the GTK for link 3, link 3 is deleted. In this case, to adjust the update periods for links 1 and 2, the GTKs may be updated and the timers may be reset with respect to links 1 and 2. At this time, the update periods may be set again. In link deletion, a link whose update timing coincides with those of a small number of other links may preferentially be deleted without deleting a link whose GTK update timing coincides with those of a large number of other links.

Procedure of GTK Update Interval Setting Processing

Subsequently, GTK update interval setting processing executed by the AP 102 will be described. The GTK update interval setting processing can be performed by the first method of deciding the length of one update interval for a plurality of links and setting the length for all the links, as shown in, for example, FIG. 4 or 6. Alternatively, the GTK update interval setting processing may be performed by the second method of setting each of the lengths of the update intervals for some links among the plurality of links to be a length that is a multiple or submultiple of the length of the update interval of another link, as shown in, for example, FIG. 5. Note that these methods can be implemented when, for example, the control unit 202 executes the program stored in the storage unit 201. However, this is merely an example, and at least some of these processes may be executed by dedicated hardware.

Figure 7:
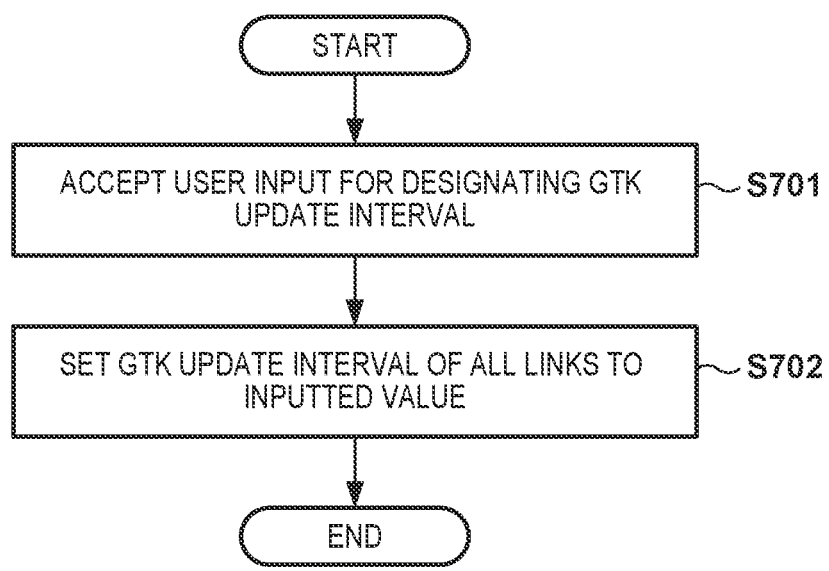
FIG. 7 is a flowchart illustrating the first example of processing of setting a GTK update interval by the AP.

FIG. 7 shows an example of the procedure of processing in a case where the AP 102 sets a GTK update interval by the first method. The processing shown in FIG. 7 is started when, for example, the user accesses the AP 102 using an application such as a Web browser to display a GTK update interval setting screen.

In this processing, the AP 102 accepts a user input for designating a GTK setting interval common to all the links (step S701). In this example, the user may be able to arbitrarily set the value of the update interval at a resolution of "sec", "min", or the like, or to make a selection only from candidates of the value of the update interval shown in a dropdown list or the like. Upon accepting the user input, the AP 102 sets the input GTK update interval as a GTK update interval for all the links to be established (step S702). This can make the update timings of the GTKs for the plurality of links coincide with each other, thereby reducing the amount of messages transmitted/received for update of the GTKs, and suppressing radio resources from being wasted, as in the example shown in FIG. 4 or 6.

Figure 8:
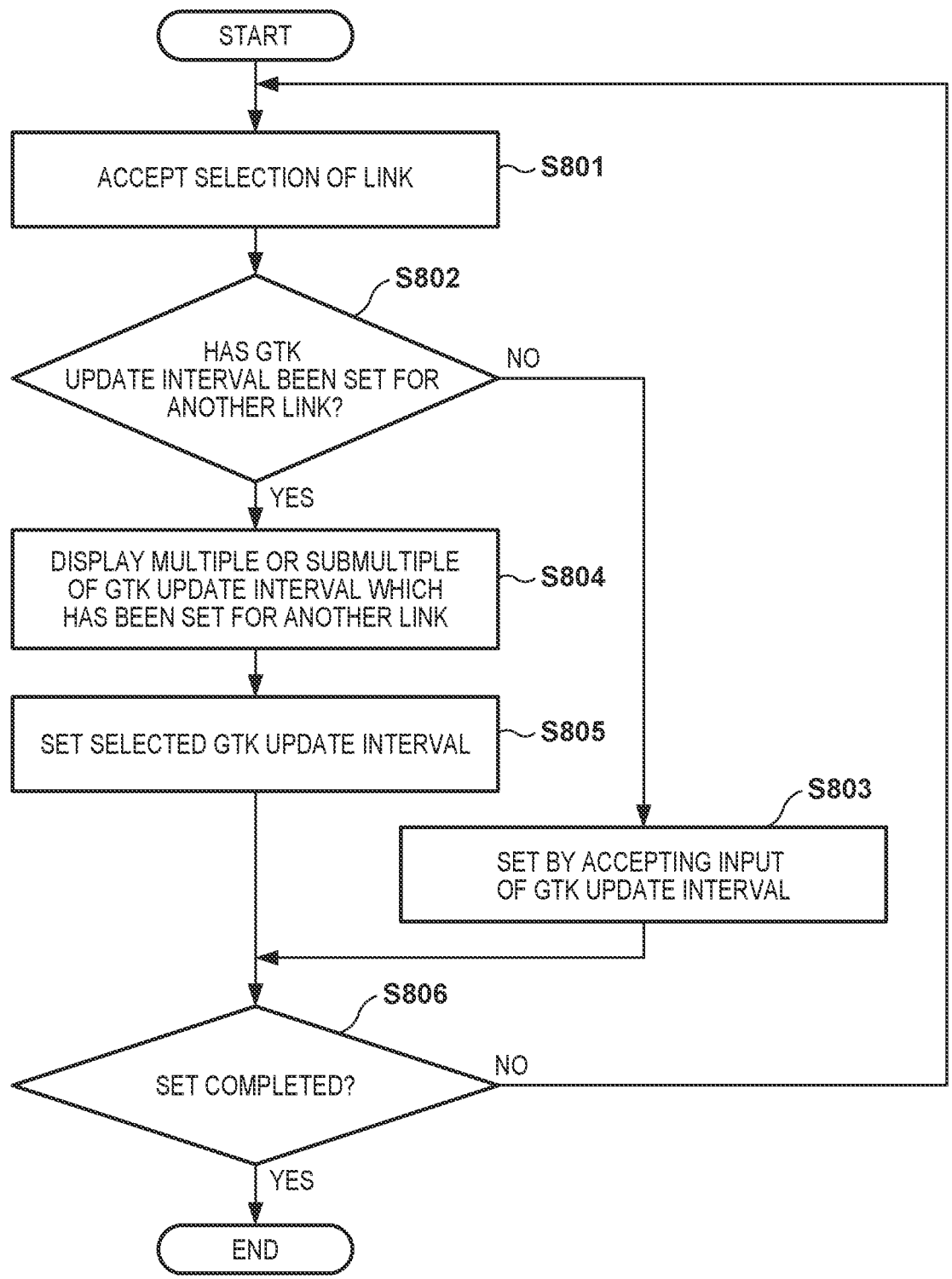
FIG. 8 is a flowchart illustrating the second example of the processing of setting the GTK update interval by the AP.

FIG. 8 shows an example of the procedure of processing in a case where the AP 102 sets a GTK update interval by the second method. The processing shown in FIG. 8 is also started when, for example, the user accesses the AP 102 using an application such as a Web browser to display the GTK update interval setting screen.

In this processing, the AP 102 accepts a user selection, from a plurality of links, of a link for which a GTK setting interval is to be set (step S801). Then, the AP 102 determines whether a GTK update interval has been set for another link different from the selected link (step S802). If the AP 102 determines that no GTK update interval has been set for any other link (NO in step S802), the AP 102 accepts a user input for designating the value of a GTK update interval, and sets the input value as the GTK update interval of the selected link (step S803). On the other hand, if the AP 102 determines that the GTK update interval has been set for another link (YES in step S802), values that are each a multiple or submultiple of the length of the set update interval are displayed as candidates of the length of the GTK update interval for the selected link (step S804). Then, the AP 102 accepts a user operation of designating one of the candidates displayed in step S804, and sets the designated value as the GTK update interval of the selected link (step S805). After the processing in step S803 or S805, the AP 102 determines whether setting of the GTK update interval is completed for all the links (step S806). If there is a link for which setting is incomplete (NO in step S806), the AP 102 returns the process to step S801. If setting is complete for all the links (YES in step S806), the AP 102 ends the processing shown in FIG. 8.

Figure 9:
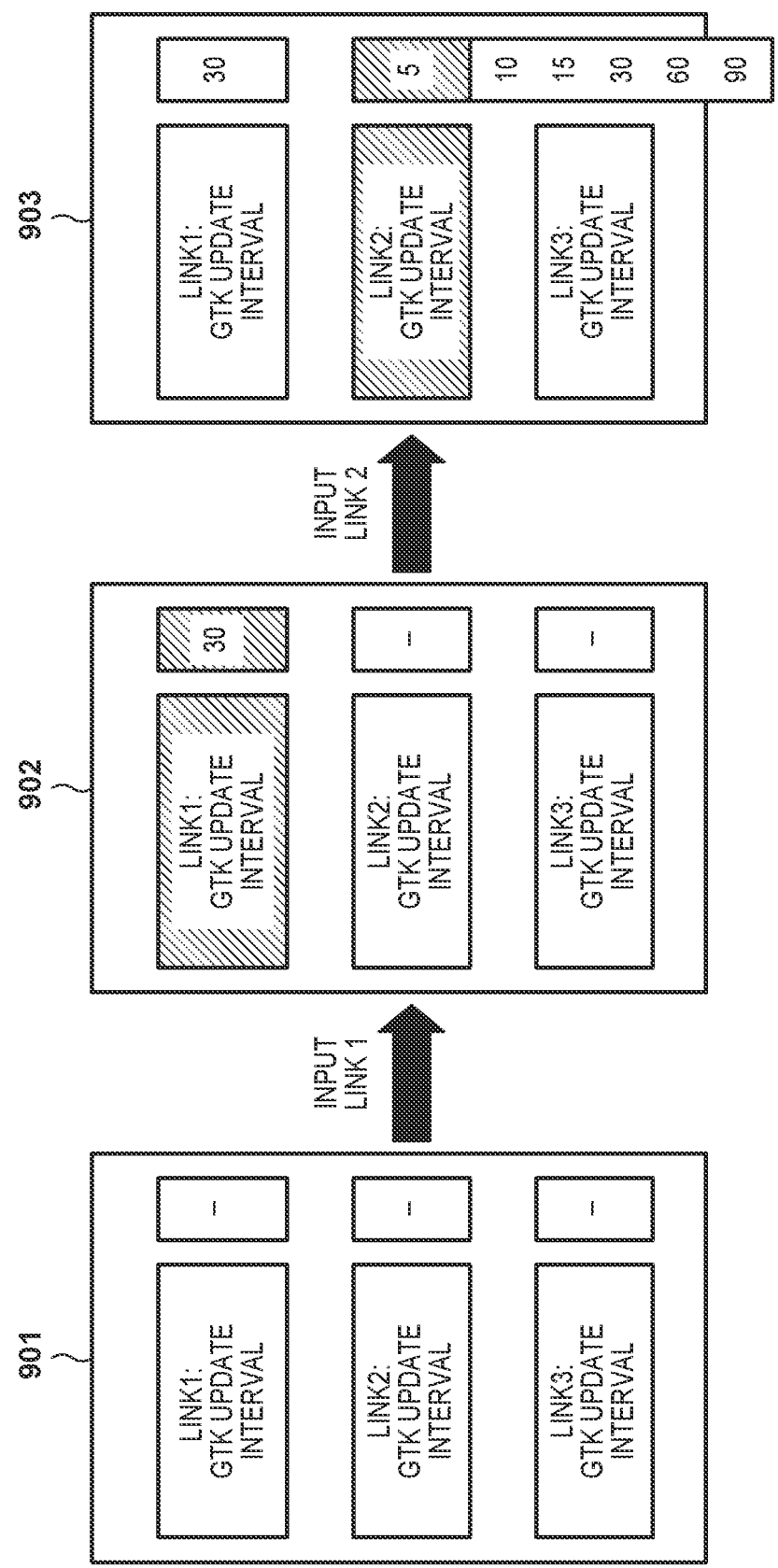
FIG. 9 is a view showing examples of a screen for setting the GTK update interval.

FIG. 9 shows transition of the GTL update interval setting screen displayed by the AP 102 when the GTK update interval setting processing shown in FIG. 8 is performed. FIG. 9 shows examples of the screen when the GTK update interval is set for each of the three links. Note that this setting screen can be, for example, a screen that is displayed on the display of a PC, a smartphone, or the like by the AP 102 when the user accesses the AP 102 by the PC, the smartphone, or the like. Furthermore, if the AP 102 includes, for example, a display such as a touch panel, this setting screen may be displayed on the display.

A screen 901 indicates a state in which no GTK update interval is set for any of the links. In the screen 901, if the user selects "link 1 GTK update interval", for example, a region corresponding to the "link 1 GTK update interval" is highlighted. If, in this state, the user inputs "30" (in one example, a unit is "sec") as the value of the update interval of the GTK for link 1, the setting screen is set in a state of a screen 902. This sets a state in which the update interval of the GTK for link 1 has been set. Assume that the user selects "link 2 GTK update interval" next. In this case, since the update interval of the GTK for link 1 has been set, a list of submultiples and multiples of the value "30" set for link 1 is displayed as candidates of the update interval of the GTK for link 2. The setting screen in this state is a screen 903. Then, the user selects one of the displayed values, thereby setting the update interval of the GTK for link 2. This can set a status in which the GTK update timings of the plurality of links coincide with each other, and it is possible to reduce the amount of messages transmitted/received for update of the GTKs, and suppress radio resources from being wasted, as in the example shown in FIG. 5.

Procedure of Communication Control

Figure 10:
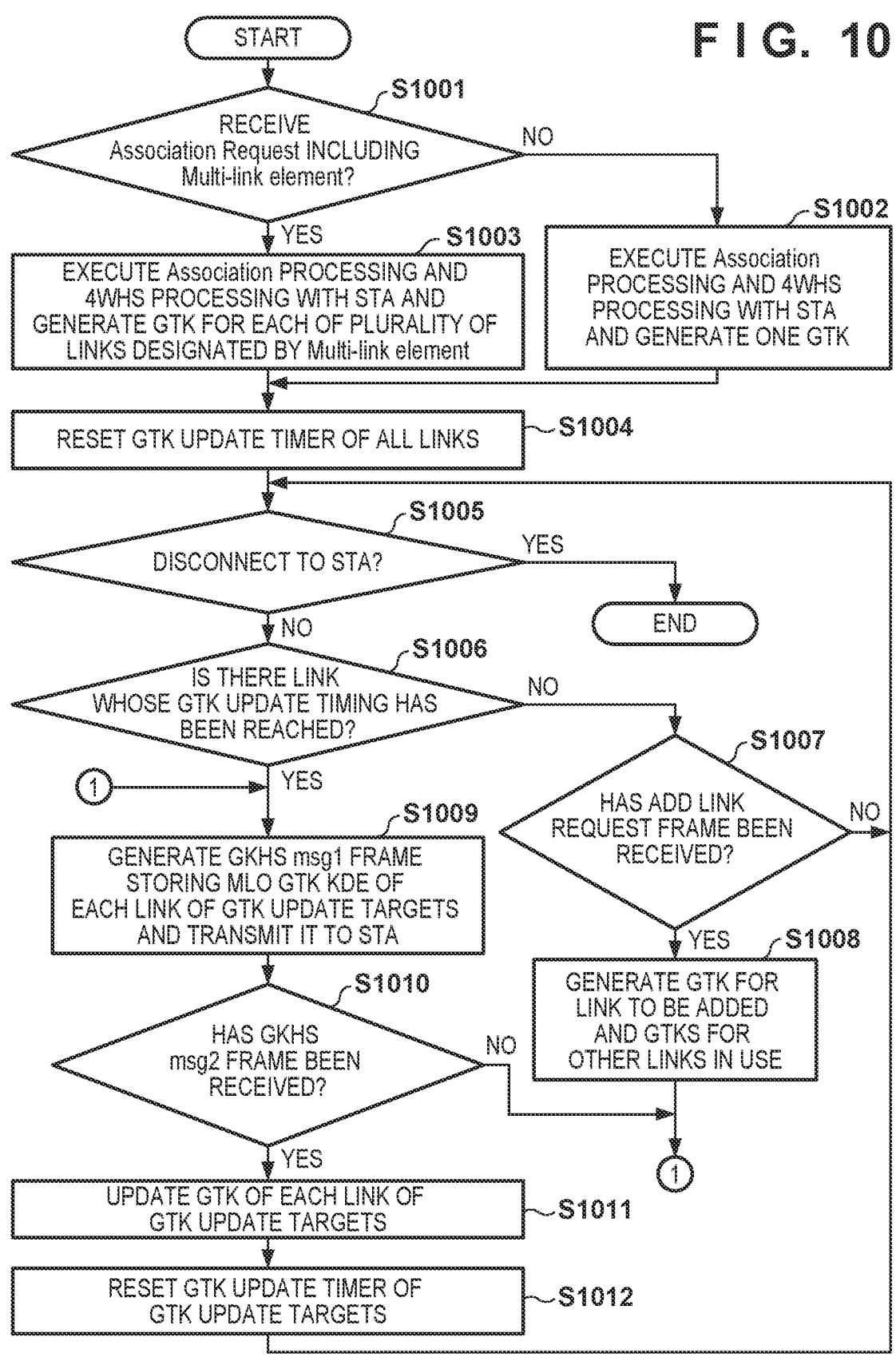
FIG. 10 is a flowchart illustrating an example of processing, by the AP, when communicating with the STA.

Subsequently, an example of the procedure of control processing when the AP 102 communicates with the STA 103 will be described with reference to Fig. The processing shown in FIG. 10 is started when, for example, the AP 102 receives a connection request from the STA 103. Note that this control processing can be implemented when, for example, the control unit 202 executes the program stored in the storage unit 201. However, this is merely an example, and at least part of the processing may be executed by dedicated hardware.

Referring to FIG. 10, the AP 102 first determines whether an Association Request frame including a Multi-link element has been received from the STA 103 (step S1001). After that, the AP 102 executes, with the STA 103, Association processing and 4WHS processing (steps S1002 and S1003). Note that the AP 102 generates a GTK during the 4WHS processing. If the AP 102 determines that an Association Request frame including no Multi-link element has been received (NO in step S1001), it can recognize to use a single link. Therefore, in this case, the AP 102 generates one GTK for the single link (step S1003). On the other hand, if the AP 102 determines that an Association Request frame including a Multi-link element has been received (YES in step S1001), it can recognize to use a plurality of links. In this case, the AP 102 generates a GTK for each of the plurality of links designated by the Multi-link element (step S1003). Based on generation of the GTKs by these processes, the AP 102 resets and activates the GTK update timers of all the links (step S1004). Then, communication between the AP 102 and the STA 103 is started.

The AP 102 determines whether a Disassociation Request frame for disconnecting the connection (for ending communications in all the links) has been received from the STA 103 (step S1005). If the connection is disconnected (YES in step S1005), the AP 102 ends this processing by executing disconnection processing. On the other hand, while the connection is not disconnected (NO in step S1005), the AP 102 monitors whether, among the links used for communication, there is a link whose GTK update timing has been reached (step S1006). Along with monitoring, the AP 102 monitors whether an Add Link Request frame for requesting to add a link has been received from the STA 103 (step S1007). While there is no link whose GTK update timing has been reached (NO in step S1006) and addition of a link is not requested (NO in step S1007), the AP 102 continues monitoring in steps S1005 to S1007. If addition of a link is requested (YES in step S1007), the AP 102 generates a GTK for the link to be added, and generates GTKs for other links in use (step S1008). If there is a link whose GTK update timing has been reached (YES in step S1006) or all the GTKs for the link to be added and the links in use have been generated in step S1008, processing in step S1009 is executed.

In step S1009, the AP 102 transmits, to the STA 103, GKHS Msg 1 including an MLO GTK KDE for each of the links as GTK update targets. Then, the AP 102 stands by for receiving a GKHS Msg 2 frame as a response to GKHS Msg 1 (step S1010). If, for example, no GKHS Msg 2 is received within a predetermined period (NO in step S1010), the AP 102 retransmits GKHS Msg 1 (step S1009). If the AP 102 receives GKHS Msg 2 (YES in step S1010), it updates the GTK (step S1011) and resets the GTK update timer (step S1012) for each of the links as GTK update targets, and then returns the process to step S1005.

In this way, it is possible to reduce the amount of messages at the time of updating the GTKs for the plurality of links, and efficiently update the GTKs while suppressing radio resources from being wasted. As a result, it is possible to execute efficient wireless communication in a wireless communication system capable of constituting a multi-link. Note that even when updating the setting value used for each of the plurality of links, it is possible to efficiently update the setting values by transmitting one message including information concerning each of links for which update timings of the setting values coincide with each other. It is possible to further improve efficiency by making it easy to update the setting values by executing the above-described processing so that the update timings of the setting values coincide with each other. The above embodiment has explained an example in which in all the plurality of links established between the AP 102 and the STA 103, at least some of the GTK update timings coincide with each other but the present invention is not limited to this. That is, the above-described processing may be performed in two or more of the plurality of links. That is, with respect to the two or more links, if the update timings coincide with each other, the GTKs are updated at the same time by one message, as described above. Alternatively, such control that the update timings coincide with each other may be executed.

Note that the above embodiment has been explained that when the AP 102 receives GKHS Msg 2 after transmitting GKHS Msg 1, update of the GTKs is completed. However, the present invention is not limited to this. That is, the AP 102 may transmit GKHS Msg 1 or a message corresponding to it, which includes GTKs for the plurality links or encryption keys corresponding to them, and may complete update of the encryption keys upon transmission. For example, in a case where communication quality of a link between the AP 102 and the STA 103 is sufficient, the STA 103 can almost certainly receive, from the AP 102, GKHS Msg 1 or the message corresponding to it. Therefore, transmission of GKHS Msg 2 or a message corresponding to it by the STA 103 may be omitted.

The above embodiment has been described by mainly focusing on the AP 102 but the above-described processing of the AP 102 may be executed by the STA 103. The above-described processing of generating an update message including information of GTKs for a plurality of links may be executed by an information processing apparatus such as a radio chip that can execute wireless communication complying with the IEEE 802.11be standard. That is, the above-described AP 102 may be regarded as the information processing apparatus. Note that the information processing apparatus such as a radio chip can include an antenna for transmitting generated signals. Furthermore, for example, a control apparatus different from two STAs may control update of GTKs when the two STAs communicate with each other using a plurality of links. In one example, the control apparatus may transmit, to the two STAs, one message for updating the GTK for each of the plurality of radio links. In this case as well, it is possible to further improve efficiency by making it easy to update the GTKs by executing the above-described processing so that the update timings for the plurality of links coincide with each other.

According to the present invention, it is possible to execute efficient wireless communication in a wireless communication system capable of constituting a multi-link.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus for executing wireless communication complying with an IEEE 802.11 standard series by establishing a plurality of links with another apparatus, comprising:
    one or more processors; and
    one or more memories that store a computer-readable instruction for causing, when executed by the one or more processors, the one or more processors to perform operations comprising:
    updating an encryption key individually set for each of the plurality of links by executing predetermined processing including transmission of a predetermined message to the other apparatus,
    wherein in the predetermined processing, the predetermined message including information associated with the encryption keys for at least two links among the plurality of links is transmitted to the other apparatus,
    wherein the operations further comprise measuring, by using a timer, a time after the encryption key is updated, and
    wherein in a case where the time measured by the timer reaches an update timing of the encryption key for one of the plurality of links, the encryption key for the corresponding link is updated.

2. The communication apparatus according to claim 1, wherein in the updating, the predetermined message is transmitted to the other apparatus by including, in the predetermined message, information of the encryption keys for the at least two links for which update timings of the encryption keys coincide with each other.

3. The communication apparatus according to claim 1, wherein the operations further comprise accepting setting, by a user, of update periods of the encryption keys for one link and another link among the at least two links such that a length of the update period of the encryption key for the one link has a length that is an integer multiple of a length of the update period of the encryption key for the other link, wherein based on the setting of the update periods of the encryption keys, the timer is reset.

4. The communication apparatus according to claim 3, wherein in a case where the update period of the encryption key for one link among the at least two links is set to a first value, the setting unit indicates, second values that are each one of a submultiple and an integer multiple of the first value are indicated as candidates of the update period of the encryption key for another link among the at least two link, and a value selected from the second values by the user is set as the update period of the encryption key for the other link.

5. The communication apparatus according to claim 1, wherein the operations further comprise accepting from a user, setting of a common update period of the encryption keys for the at least two links, wherein based on the setting of the update period of the encryption keys, the timer is reset.

6. The communication apparatus according to claim 1, wherein in a case where a link is added with respect to the other apparatus, when setting the encryption key for the link to be added, the predetermined message including the encryption key for the link to be added and also including the encryption key for a link already used between the communication apparatus and the other apparatus is transmitted to the other apparatus.

7. The communication apparatus according to claim 1, wherein in a case where a link used with the other apparatus is deleted, the predetermined message including the encryption key for a link to be maintained without deletion is transmitted to the other apparatus.

* * * * *